Figure 1:
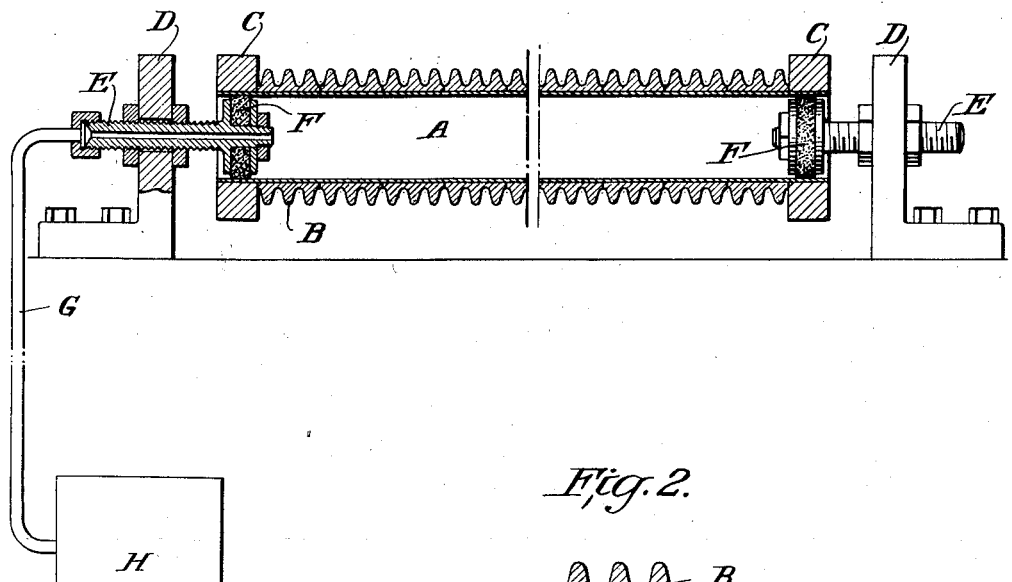

Dec. 31, 1929.   W. H. WINSLOW   1,741,217
SUPERHEATER TUBE AND METHOD OF MAKING SAME
Original Filed Oct. 29, 1921

Inventor
William H. Winslow
By his Attorneys,
Kerr, Page, Cooper & Hayward

Patented Dec. 31, 1929

1,741,217

UNITED STATES PATENT OFFICE

WILLIAM H. WINSLOW, OF CHICAGO, ILLINOIS, ASSIGNOR TO FOSTER WHEELER CORPORATION, OF NEW YORK, N. Y., A CORPORATION OF NEW YORK

SUPERHEATER TUBE AND METHOD OF MAKING SAME

Application filed October 29, 1921, Serial No. 511,508. Renewed June 1, 1929.

The invention, subject of this application for patent is an improvement in the method of making superheaters for steam boilers, or other tubular structures of like nature, in which plain or ordinary tubes, usually of wrought iron are enclosed by an envelope or covering of rings, preferably of cast iron, which are of such exterior conformation as to afford a heat absorbing or radiating surface greater, and sometimes substantially greater than the tube itself.

Where these tubes are used in superheaters, the device is commonly known in the art as a Foster superheater, and it has been found to possess many advantages over the plain or bare tube variety in its greater capability of resisting the high temperature of the gases of combustion, and for other reasons.

Heretofore these devices have been made by forming the iron rings of the desired shape and dimensions, machining the opening through them to the proper diameter, then heating and expanding them, and slipping them while hot over the tubes so that on cooling they are shrunk onto the tubes and are firmly united thereto.

This method of manufacture is not without its more or less serious objections. It is not easy to obtain tubes of exactly fixed diameter, nor rings with holes of the exact and proper size to fit them, hence it is almost invariably necessary to machine the rings in order to get the holes of the desired diameter with reference to the tubes so as to properly shrink them onto the latter.

Seeking to overcome this objection and to provide a more economical and satisfactory method of providing the tubes with their enveloping rings, I have devised and successfully carried out the following plan:—I obtain tubes of approximately a standard external diameter, and cast the rings, of whatever kind they may be, with holes through them of a slightly greater diameter than that of the pipes, and slip them over the latter to form the envelope. I then subject the tubes to a hydraulic pressure sufficient to expand them into close union with the rings.

In practice I have found that the expansion must be sufficient in amount or degree to exceed the elastic limit of the tubes. In other words if the rings fit the tubes too closely, the expansion of the latter is followed on the withdrawal of the pressure with a corresponding contraction which leaves the rings loose on the tubes. If, however, there is an appreciable difference between the diameter of the tubes and that of the opening in the rings, which in practice I have found to be about one-eighth of an inch in the case of two inch tubes, then when the tubes are expanded to fit the rings, they remain in their expanded condition on the withdrawal of pressure, and maintain under all conditions of use a tight fit between the two.

Figure 2:
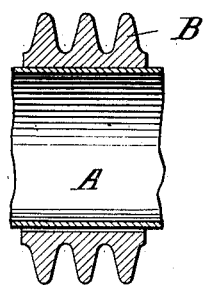

The carrying out of the invention requires no special apparatus or appliances other than those commonly used in such cases, but for illustration I have shown an ordinary device for the purpose. In the drawing Fig. 1 is a conventional representation of a tube enclosed in a corrugated envelope of rings or sections and means for creating a hydraulic pressure within the tube. Fig. 2 is a sectional view of the tube and a surrounding ring.

A is a tube, B B are the rings which are of slightly greater diameter and are slipped over it.

It being desirable that about one inch at the end or ends of the tubes shall be left in its normal or unexpanded condition in order that it may the more readily be expanded into the tube sheets or superheater headers, these ends are covered with tight fitting rings C which do not permit of any substantial expansion at these points.

D D are heads carrying plungers E provided at their ends with expansion pistons F which are fitted into the ends of the tube, and through one of these plungers extends a duct or pipe G from a suitable hydraulic pump or pressure machine H.

After the pistons are fitted into the ends of the pipe, a pressure is developed within the latter which tightens the joints with the pipe and this pressure is raised to about 4,000 pounds per square inch, which is usually sufficient to produce the necessary expansion.

As above stated, for a two inch pipe, rings having an internal diameter of about one-eighth of an inch greater should be used, and as exact dimensions are not essential, little or no machining of the rings will be found necessary. After the tube under these conditions has been expanded it remains so and the tubes and rings will be closely and firmly united under all ordinary conditions of use.

Superheaters and similar devices of this class are made in endless shapes and forms, as are also the surrounding envelopes or rings, but in all cases where the tubes are enveloped by independently made coverings of rings or their equivalents this method of uniting the two may be practiced with great advantage on the score of economy and facility of manufacture.

What I claim as my invention is:

1. The method of uniting a tube and a surrounding envelope of independently made rings, which consists in stringing over the tube independent abutting rings of substantially greater diameter than the outer diameter of the tube, then expanding the tube by uniform internal pressure of sufficient intensity to burst the tube and expand it beyond its elastic limit while restraining any such bursting at any points along the tube by means of said abutting rings, said expanding of said tube causing it to be expanded into close contact with the interior of the rings to a point beyond the limit of elasticity of the tube.

2. The method of constructing superheater and similar tubes which consists in surrounding a tube of elastic material with rings of greater diameter than the tube at all points intermediate the ends of the tube, placing on said tube adjacent its ends rings or like parts which closely abut the exterior of said tube, and then expanding the tube to meet the larger rings and by said end rings preventing the expansion of the tube at points adjacent the end portion.

3. The method of constructing superheater and like tubes which consists in stringing over an elastic ferrous tube a plurality of non-elastic cast iron rings of substantially greater diameter than the outer diameter of the tube, closing the ends of the tube and subjecting the interior of the tube to uniform fluid pressure to stretch the tube radially and uniformly beyond its elastic limit and into firm contact with the interior of all of the rings.

4. A ferrous superheater tube having its middle portion of greater diameter than its ends, and a plurality of rings tightly encircling said middle portion, said rings being contiguous to each other, said middle portion being stretched beyond its last elastic limit into firm contact with said rings.

5. A tube for superheating purposes comprising a ferrous inner tube of elastic material, an outer tube consisting of ferrous rings of substantially unelastic material mounted on said inner tube, said rings forming an outside tube and having the inner tube stretched beyod its elastic limit into firm contact with the inner surface of the rings.

In testimony whereof I hereto affix my signature.

WILLIAM H. WINSLOW.